United States Patent [19]

Sugiyama

[11] Patent Number: 5,184,316
[45] Date of Patent: Feb. 2, 1993

[54] SYSTEM FOR VERY EFFICIENTLY CODING BY PERFORMING INTERBLOCK AND INTRABLOCK NORMALIZATION

[75] Inventor: Kenji Sugiyama, Noda, Japan
[73] Assignee: Victor Company of Japan, Ltd., Japan
[21] Appl. No.: 407,165
[22] Filed: Sep. 14, 1989

[30] Foreign Application Priority Data

Sep. 16, 1988 [JP] Japan ............................... 63-233307

[51] Int. Cl.$^5$ ........................ G06F 7/00; G06F 15/00
[52] U.S. Cl. ............................................... 364/715.02
[58] Field of Search .................. 364/715.02, 725; 382/56; 358/133, 261.2, 261.3, 426; 375/122

[56] References Cited

U.S. PATENT DOCUMENTS

| | | | |
|---|---|---|---|
| 3,984,626 | 10/1976 | Mounts et al. | 358/133 |
| 4,179,709 | 12/1979 | Workman | 358/133 |
| 4,707,738 | 11/1987 | Ferre et al. | 358/135 |
| 4,780,761 | 10/1988 | Daly et al. | 358/133 |
| 4,845,560 | 7/1989 | Kondo et al. | 358/133 |
| 4,890,161 | 12/1989 | Kondo | 358/133 |

FOREIGN PATENT DOCUMENTS 63-56867 3/1988 Japan .
63-62417 3/1988 Japan .

OTHER PUBLICATIONS

IEEE Transactions of Communications, Mar. 1984, vol. COM-32, No. 3, Piscataway Wen-Hsiung Chen et al., "Scene Adaptive Coder", pp. 225-232.

*Primary Examiner*—Dale M. Shaw
*Attorney, Agent, or Firm*—Lowe, Price, LeBlanc & Becker

[57] ABSTRACT

A highly efficient coding system includes a blocking device for dividing input signals representing sampled values into a plurality of blocks and outputting first output signals representing the plurality of blocks. An orthogonal transformation device effects an orthogonal transformation of the first output signals of the blocking device corresponding to the blocks, to divide the results of the orthogonal transformation into a mean component and variation components thereof, and to output the mean component and the variation components. A first normalizing device is provided for effecting interblock normalization of the mean component and the variation components outputted from the orthogonal transformation device and for outputting second output signals representing results of the interblock normalization, and a second normalizing device normalizes variation components of the second output signals of the first normalizing device in each of the blocks.

11 Claims, 6 Drawing Sheets

SYSTEM FOR VERY EFFICIENTLY CODING BY PERFORMING INTERBLOCK AND INTRABLOCK NORMALIZATION

BACKGROUND OF THE INVENTION

1. Field of the Invention

This invention generally relates to an efficient coding system and more particularly to a highly efficient coding system which can perform highly efficient coding of a small block of an input image.

2. Description of the Related Art

Half tone image signals, of which a typical example is television signals, include a vast quantity of information. Therefore, a broad-band transmission line is necessary for transmission of such half tone image signals. Further, a bulk memory is necessary for recording of such half tone image signals.

On the other hand, redundancy, that is, self-correlation of such an image signal is high. Thus, efficient coding systems and methods for reducing the redundancy of the image signal and for efficiently transmitting and recording the image have been studied and developed.

Typical and fundamental methods for reducing the redundancy are a predictive coding and a transform coding and so on.

First, the predictive coding, which is referred to also as a differential coding or a differential pulse-code modulation (PCM), is a method which predicts the current sampled value of a pixel or picture element from the actual sampled value of a pixel already coded and then effects coding of a prediction error, that is, a difference between the predicted value and the actual value.

Further, the transform coding is a method wherein first, sampled values of data indicated by original image signals are transformed as to "bases" which are independent of or intersect orthogonally to each other, that is, effect an orthogonal transform of each block of original image data represented by original signals to obtain components, which are adapted to characteristics of the original image data and are independent with each other, and then coding of the components is effected.

Hereinafter, the transform coding will be described in detail.

First, it is to be noted that generally, low-frequency components of image signals have a large proportion of electric power of the image signals and thus high-frequency components of image signals have a small portion of the electric power thereof but the latter components play an important role in representing information.

Therefore, the coding of the original image signals can be efficiently performed as a whole by first transforming the image signals into such components, then effecting quantization of each of such components in a manner suitably adapted thereto, further coding the result of the quantization, thereafter transmitting the resultant codes to a receiving system and finally performing an inverse transform of the transmitted codes in the receiving system to restore the original image.

Thus, in the transform coding, an original image or picture is first divided into blocks each composed of a suitable number of pixels. Then, as to each of the blocks, an orthogonal transform of a sequence of sampled numerical values is effected. That is, a linear transformation of the sequence of the sampled values is performed with respect to "bases" which are adapted to characteristics of the original image signals and are independent of each other.

Thus, the resultant components (that is, the values obtained by the transformation) become more independent of, that is, more uncorrelated to each other in comparison with the original sampled values. Thereby, redundant information can be reduced.

In short, the predictive coding is a method to reduce the correlation among the sampled data by performing a transforming operation on a "time domain" and on the other hand the transform coding is a method to eliminate the correlation by a transforming operation on a "frequency domain".

As a result, the electric power is distributed to specific components, that is, to a limited range of components of the image signals due to statistical properties of the image signals. Then, further taking visual characteristics of the restored image into consideration, a greater number of bits are allocated to the components of which electric power is large, and in contrast the components, of which electric power is small, are coarsely quantized by use of a small number of bits. Thereby, a bit rate, that is, a number of bits per block can be reduced as a whole.

Generally, Fourier transform is familiar to an orthogonal transformation. However, in the technical field of image signal processing, Discrete Cosine Transform (DCT) is mainly used.

Further, the order of the transform is usually set as, for example, 4, 8 or 16. In general, the higher the order of the transform becomes, the higher the efficiency of the coding becomes.

Incidentally, a large quantity of literature is available on the transform coding. For example, in an article entitled "Discrete Cosine Transform" by N. Ahmed, T. Natarajan and K. R. Rao, IEEE Transactions on Computers, January 1974, a discrete cosine transform (DCT) is defined and an algorithm to compute it using the fast Fourier transform is developed. It is shown that the discrete cosine transform can be used in the area of digital processing for the purposes of pattern recognition and Wiener filtering. Its performance is compared with that of a class of orthogonal transforms and is found to compare closely to that of the Karhunen-Loeve transform, which is known to be optimal. The performance of the Karhunen-Loeve and discrete cosine transforms are also found to compare closely with respect to the rate-distortion criterion.

The DCT of a data sequence $X(m)$, $m = 0, 1, \ldots, (M-1)$ is defined as $$G_x(0) = \frac{\sqrt{2}}{M} \sum_{m=0}^{M-1} X(m) \qquad (1)$$

$$G_x(k) = \frac{2}{M} \sum_{m=0}^{M-1} X(m) \cos \frac{(2m+1)k\pi}{2M},$$

$$k = 1, 2, \ldots, (M-1)$$

where $G_x(k)$ is the kth DCT coefficient. It is worthwhile noting that the set of basis vectors $\{1/\sqrt{2}, \cos((2m+1)k\pi)/(2M)\}$ is actually a class of discrete Chebyshev polynomials. This can be seen by recalling that Chebyshev polynomials can be defined as (3)

$$\hat{T}_o(\xi_p) = \frac{1}{\sqrt{2}} \qquad (2)$$

-continued
$$\hat{T}_k(\xi_p) = \cos(k \cos^{-1} \xi_p), k,p = 1, 2, \ldots, M$$

where $\hat{T}_k(\xi_p)$ is the kth Chebyshev polynomial.

Now, in (2), $\xi_p$ is chosen to be the pth zero of $\hat{T}_M(\xi)$, which is given by (3)

$$\xi_p = \cos \frac{(2p-1)\pi}{2M}, p = 1, 2, \ldots, M \quad (3)$$

Substituting (3) in (2), one obtains the set of Chebyshev polynomials $$\hat{T}_0(p) = \frac{1}{\sqrt{2}} \quad (4)$$

$$\hat{T}_k(p) = \cos \frac{(2p-1)k\pi}{2M}, k,p = 1, 2, \ldots, M.$$

From (4) it follows that the $\hat{T}_k(p)$ can equivalently be defined as $$T_0(m) = \frac{1}{\sqrt{2}} \quad (5)$$

$$T_k(m) = \cos \frac{(2m+1)k\pi}{2M};$$

$$k = 1, 2, \ldots, (m-1), m = 0, 1, \ldots, M-1.$$

Comparing (5) with (1) we conclude that the basis member $\cos((2m+1)k\pi)/(2M)$ is the kth Chebyshev polynomial $T_k(\xi)$ evaluated at the mth zero of $T_M(\xi)$.

Again, the inverse cosine discrete transform (ICDT) is defined as $$X(m) = \frac{1}{\sqrt{2}} G_x(0) + \sum_{k=1}^{M-1} G_x(k) \cos \frac{(2m+1)k\pi}{2M}, \quad (6)$$

$$m = 0, 1, \ldots, (M-1).$$

We note that applying the orthogonal property (3)

$$\sum_{m=0}^{M-1} T_k(m) T_l(m) = \begin{cases} M/2, & k = l = 0 \\ M/2, & k = l \neq 0 \\ 0, & k \neq l \end{cases} \quad (7)$$

to (6) yields the DCT in (1).

If (6) is written in matrix form and $\Lambda$ is the (M×M) matrix that denotes the cosine transformation, then the orthogonal property can be expressed as $$\Lambda^T \Lambda = \frac{M}{2} [I] \quad (8)$$

where $\Lambda^T$ is the transpose of $\Lambda$ and [I] is the (M×M) identity matrix.

Thus, the foregoing has shown that the DCT can be used in the area of image processing for the purposes of feature selection in pattern recognition; and scalar-type Wiener filtering. Its performance compares closely with that of the LKT, which is considered to be optimal. The performances of the KLT and DCT are also found to compare closely, with respect to the rate-distortion criterion.

However, the conventional transform coding has the following problem. Indeed, when the order of the transform is increased, the numerical efficiency of the coding becomes higher but subjective picture quality, that is, picture quality obtained by actual visual evaluation of a restored picture is not always improved.

The causes of this are as follows. First, as the order of the transform increases, the shape of a block distortion becomes a large block-like one to an extent sufficient to be conspicuous in the restored picture. Further, errors occur in a wide range from peripheral portions of edges of an object to a flat portion in which the gray level is not substantially changed and thus picture quality is often degraded.

Further, by the orthogonal transform, fine figures or patterns such as a thin segment are decomposed into components thereof in such a manner to disappear from a picture. Thus, in this respect, the picture quality is degraded.

Moreover, in a case where the order of the transform is high, unless the precision of computation in a coding system is equal to that of computation in the decoding (receiving) system, the picture quality is degraded. Therefore, in such a case, it is necessary for improving the picture quality to make the precision of computation high in both the coding system and the receiving system.

In order to make the precision of computation high, there is a necessity for increasing word length employed in processing in hardware. Thus, the conventional transform coding has another problem that the size of the hardware becomes large and the cost is increased.

The higher the order of the transform becomes, the more conspicuous the drawbacks have become.

The present invention is provided to eliminate the defects of the conventional coding system.

It is therefore an object of the present invention to provide an highly efficient coding system which can very efficiently perform coding with a relatively low order of the orthogonal transform, a simple configuration and a low cost and without the degradation of the subjective picture quality as caused in the conventional system by effecting normalization at least two times, that is, performing interblock normalization and normalization of data in each block.

SUMMARY OF THE INVENTION

To achieve the foregoing object and in accordance with a first aspect of the present invention, there is provided a system for converting an input digital signal to an efficiently encoded output signal having reduced redundancy, which is capable of transmission over limited bandwidth communication channel and of storage in a limited storage, which includes means for receiving input signals including data and converting means for converting the input signals to output signals by reducing redundancy of data in the input signals. The converting means includes a blocking means for dividing the input signals representing sampled values of the data into a plurality of blocks and outputting first output signals representing the plurality of blocks; and orthogonal transformation means for receiving the first output signals of the blocking means representing the blocks and performing an orthogonal transformation of the first output signals. The orthogonal transformation means includes means for obtaining a mean component of the result of the orthogonal transformation and generating a mean component signal representing the mean component, and means for obtaining a variation component of the result of the orthogonal transformation and generating a variation component signal representing the variation component. The system includes a first normalizing means connected to receive the mean component signal and the variation component signal, for performing an interblock normalization of the mean component signal and the variation component signal and for generating second output signals representing results of the interblock normalization, and a second normalizing means connected to receive the second output signals for performing a normalization of variation components of the second output signals of the first normalizing means in each of the blocks, and for generating third output signals representing a result of the normalization of variation components.

Further, in accordance with a second aspect of the invention, there is provided a highly efficient coding system for converting input signals to efficiently coded output signals, which includes a blocking means for dividing input signals representing sampled values into a plurality of blocks and outputting first output signals representing the plurality of blocks, an orthogonal transformation means for receiving the first output signals of the blocking means corresponding to the blocks and for generating a mean component signal representing a mean component of a result of an orthogonal transformation of the first output signals and a variation component signal representing a variation component of the result of the orthogonal transformation of the first output signals, and a first normalizing means for receiving the mean component signal and the variation component signal and for generating second output signals representing results of an interblock normalization of the mean component signal and the variation component signal, wherein the first normalizing means includes a vector quantization means for receiving the mean component signals and the variation component signals and for generating a normalizing information signal representing a result of a quantization of an original representative value, which is a minimum value of the mean components represented by the mean component signals, and a variation value, which is a larger one of a maximum value of the variation components represented by the variation component signals and a difference between a maximum value and the minimum value of the mean components.

The first and second normalizations are effected on the resultant components (hereunder sometimes referred to simply as "coefficients") of the orthogonal transform.

First, the first normalization is effected on all sets of the "coefficients", each set of the "coefficients" being obtained by the orthogonal transform of each of the plurality of the blocks. Further, by the first normalization, the mean components and the variation components which have close interblock correlation are normalized in common and thus a normalization using interblock correlation is effected on the "coefficients".

Further, the second normalization is effected on only the variation components every block of sampled values transformed orthogonally. Thus, in comparison with the first normalization, the second normalization is effected on smaller blocks. Thereby, useless regions of "coefficients" can be eliminated. Further, quantization having a precision appropriate to the visual characteristics can be effected.

Thereby, the efficiency of coding is substantially increased. Further, the order of the transform can be relatively low. Moreover, the degradation of the subjective picture quality as caused in the conventional system can be eliminated. Furthermore, the coding can be effected with a simple configuration at a low cost.

BRIEF DESCRIPTION OF THE DRAWINGS

Other features, objects and advantages of the present invention will become apparent from the following description of a preferred embodiment with reference to the drawings in which like reference characters designate like or corresponding parts throughout several views, and in which.

DETAILED DESCRIPTION OF PREFERRED EMBODIMENT

Hereinafter, a preferred embodiment of the present invention will be described by referring to the accompanying drawings.

Figure 1:
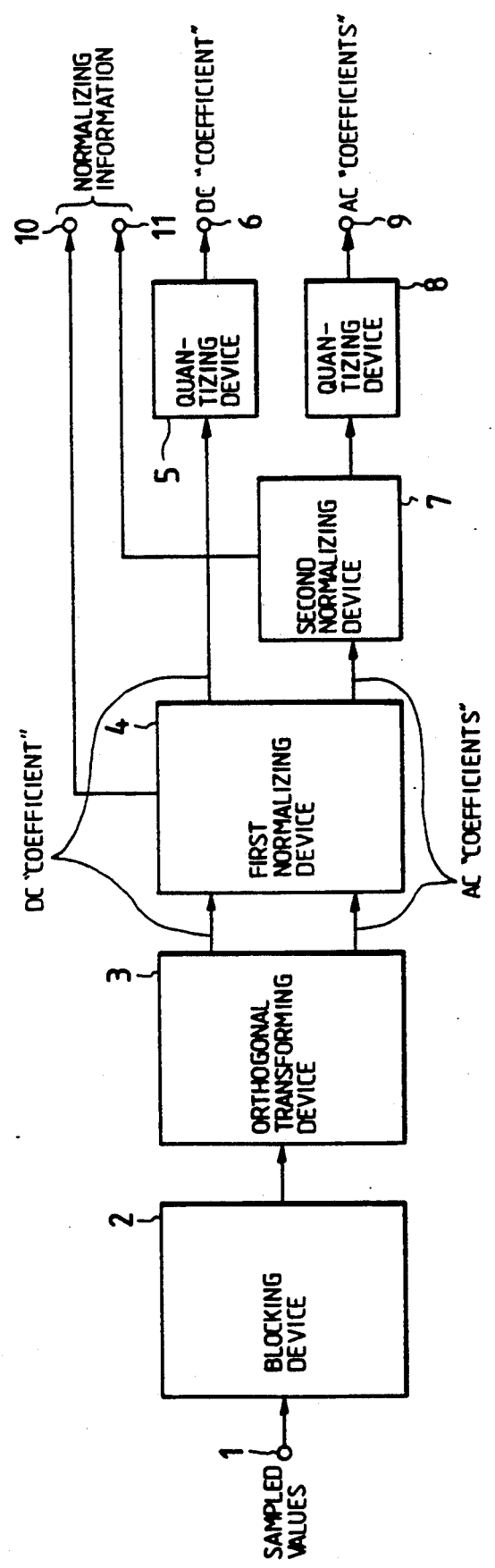
FIG. 1 is a block diagram showing a highly efficient coding system embodying the present invention.

Referring first to FIG. 1, there is shown a highly efficient coding system embodying the present invention. As shown in this figure, input signals (hereunder sometimes referred to as sampled-value inputting signals) representing sampled values are inputted from an input terminal 1 and supplied to a blocking device 2. This blocking device 2 divides the sampled-value inputting signals, which are usually sampled from image signals in the order of pixels scanned by a raster scan, into a plurality of blocks by use of line memories. Then, the device 2 outputs the sampled-value inputting signals in the order of blocks.

Further, the output signals of the blocking device 2 are fed to an orthogonal transforming device 3 which transforms every block orthogonally and outputs "coefficients" of the number which is the same with that of the sampled values inputted thereto. One of the "coefficients" is a mean component (that is, a DC component or "coefficient") and all of the other are variation components (AC components or "coefficients").

Moreover, the output signals of the orthogonal transforming device 3 representing the DC and the AC "coefficients" are supplied to a first normalizing device 4 of which an operation will be described in detail hereinlater.

The first normalizing device 4 effects the interblock normalization of the inputted DC "coefficients" and that of the inputted AC "coefficients" by using different methods, respectively. Furthermore, the first normalizing device 4 outputs the DC "coefficients" and AC "coefficients" normalized as described above.

Hereinafter, an example of a practical concrete normalizing method is described in detail.

In case of this normalizing method, first, a signal to be coded is divided by a regular interval into blocks. In that regard, various sorts of blocks can be employed according to a kind of a signal to be coded. For example, in a case where the signal to be coded represents a speech sound varying with time or pixels of an image aligned on a scanning line, a one-dimensional block is employed. Further, in case of processing two-dimensional image data which can vary in horizontal and vertical directions, a two-dimensional block is used. Furthermore, in case of processing three-dimensional image data which represents, e.g., a moving picture, a three-dimensional block is employed. Then, a conversion (namely, a normalization) of a signal within each block is performed.

Next, an example of a method for normalizing a signal within a block will be described hereunder. In a case where the normalization of a signal within a block is effected by using maximum and minimum values of one-dimensional sampled-data of the signal, an i-th normalized value $Y_i$ of the sampled-data is given by:

$$Y_i = k(X_i - X_{min})/(X_{max} - X_{min}) \quad (1)$$

(incidentally, $i = 1, 2, 3a \ldots N$) where $X_i$ denotes an i-th input value of the sampled-data within the block; $X_{min}$ the minimum value of the sampled data within the block; $X_{max}$ the maximum value of the sampled data within the block; N the number of the sampled-data within the block; and k a normalization factor. Therefore, when the i-th input value $X_i$ is equal to the minimum value $X_{min}$, the i-th normalized value $Y_i$ becomes 0. In contrast, when the i-th input value $X_i$ is equal to the maximum value $X_{max}$, the i-th normalized value $Y_i$ becomes equal to the normalization factor k. Thus, the normalized values $Y_i$ to $Y_N$ corresponding to the input values $X_1$ to $X_N$ range from 0 to k.

Further, this example of the method employs two kinds of normalization parameters to be set correspondingly to each block when the normalization of a signal of each block is performed in accordance with the equation (1) by using minimum and maximum values of sampled-data in each block. A maximum value $X_{max}$ (or a minimum value $X_{min}$) of the sampled-data within a block is used as one kind of normalization parameter, namely, providing information on a voltage level (i.e., a value of the amplitude) of a signal within a block. On the other hand, a difference ($X_{max} - X_{min}$) between the maximum value $X_{max}$ and the minimum value $X_{min}$ is used as the other kind of normalization parameter, namely, providing information on a degree of change of a signal within each block.

Next, there is described an operation of normalizing each sampled-data $X_i$ within each block according to the equation (1) by using the maximum value $X_{max}$ and the minimum value $X_{min}$ thereof. Referring to FIG. 6 by way of example, the following describes a case where eight serial sampled-data (namely, $N = 8$) belong to each of successive blocks A and B which are obtained by dividing a signal representing one-dimensional data, which is an object to be coded, by a constant interval. The data are hereunder referred to as a one-dimensional discrete signal.

Figure 6A:
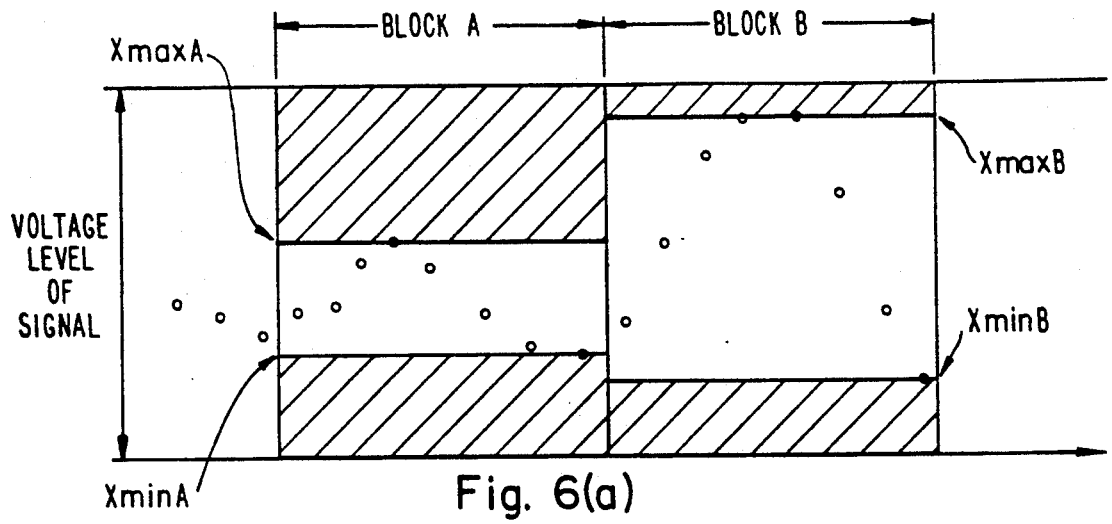
FIGS. 6($a$) and ($b$) are diagrams illustrating sampled-data belonging to each of blocks A and B.

FIG. 6(a) is a diagram illustrating the sampled-data belonging to each of the blocks A and B. The y axis of this diagram represents a voltage level of the signal and the x axis thereof denotes time. Further, the sampled-data are indicated by open circles. In FIG. 6(a), a reference character XmaxA designates a voltage level of the signal corresponding to the maximum value of the eight sampled-data belonging to the block A; XminA designates a voltage level of the signal corresponding to the minimum value of the eight sampled-data belonging to the block A; XmaxB designates a voltage level of the signal corresponding to the maximum value of the eight sampled-data belonging to the block B; and XminB designates a voltage level of the signal corresponding to the minimum value of the eight sampled-data belonging to the block B. For the example of FIG. 6(a), the voltage levels of the eight sampled-data belonging to the block A are less than or equal to nearly thirty percent of the maximum amplitude of the signal. In contrast, the voltage levels of the eight sampled-data belonging to the block A extend over almost all of the range of the amplitude of the signal.

Figure 6B:
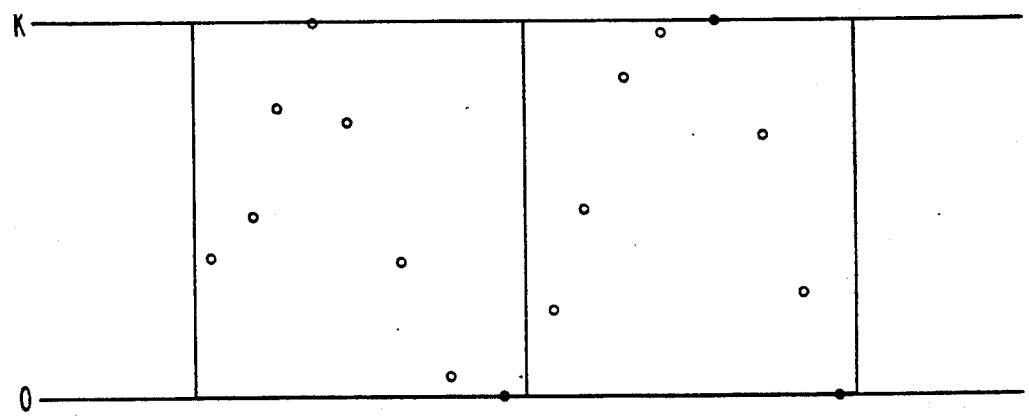

When the normalization of the voltage levels (i.e., the amplitudes) of the sampled-data of each of the blocks A and B is effected in accordance with the equation (1), the sampled-data each having a value corresponding to the minimum voltage level of the sampled-data of each of the blocks A and B prior to the normalization as shown in FIG. 6(a) is made to become 0. On the other hand, the sampled-data each having a value corresponding to the maximum voltage level is made to be equal to k as illustrated in FIG. 6(b).

Figure 7:
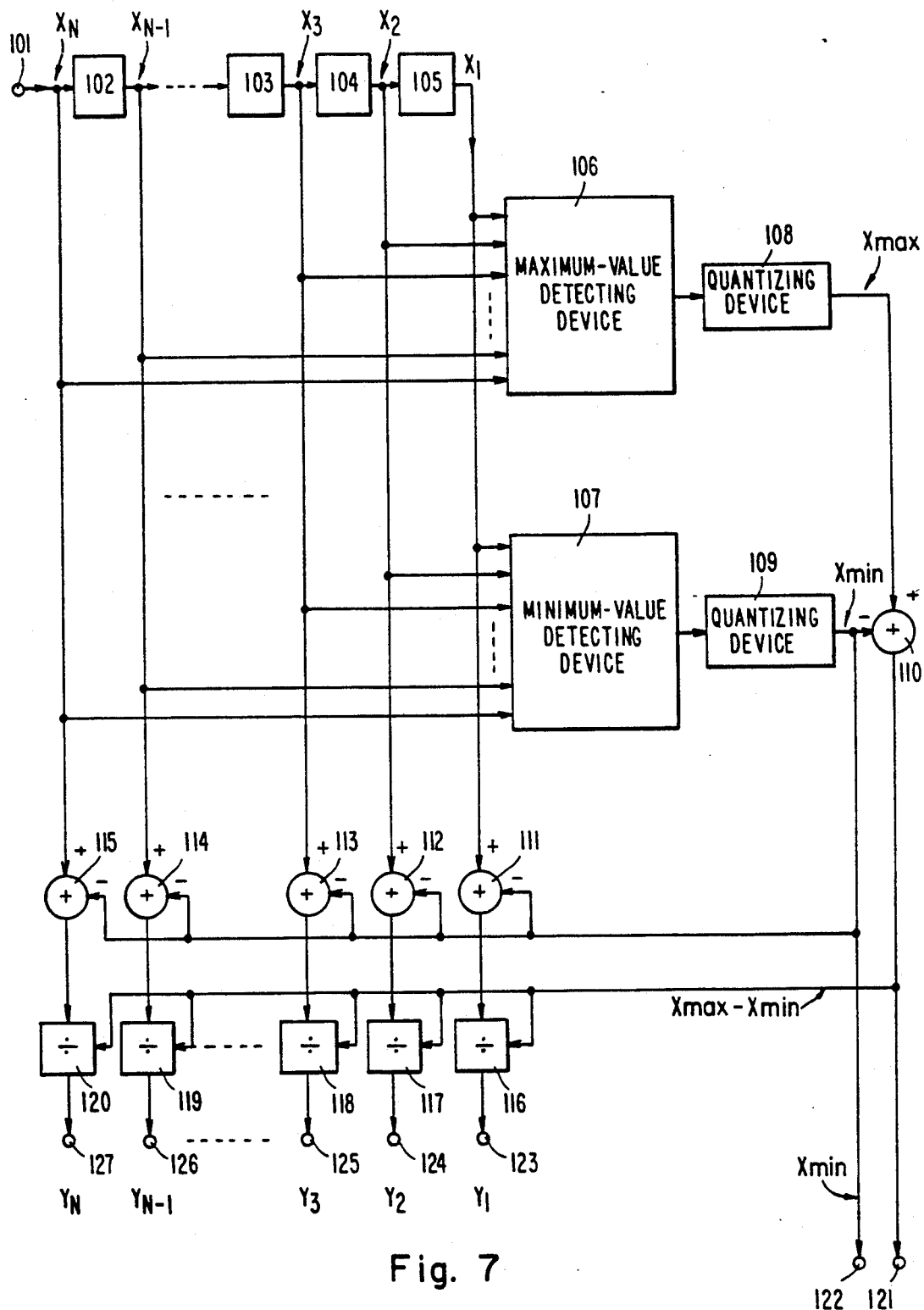
FIG. 7 is a schematic block diagram showing the construction of an example of a normalization device.

Referring now to FIG. 7, there is shown an example of a normalization device for effecting such a normalization operation.

In FIG. 7, reference numeral 101 designates an input terminal for receiving a discrete signal to be coded; numerals 102 to 105 designate delay circuits each for delaying the signal supplied thereto by a constant interval (i.e., a sampling period used to generate the discrete signal); 106 designates a maximum-value detecting circuit; 107 designates a minimum-value detecting circuit, and 108 and 109 designate quantization circuits. 110 to 115 designate subtractors; 116 to 120 designate dividers; 121 and 122 designate output terminals for outputting the two kinds of normalization parameters and 123 to 127 designate output terminals for outputting quantization data. The discrete signal supplied to the input terminal 101 is fed to the series of the delay circuits 102 to 105.

When the discrete signal X1 is outputted from the delay circuit 105 to the maximum-value detecting circuit 106, the minimum-value detecting circuit 107 and the subtractor 111, the discrete signal X2 is outputted from the delay circuit 104 to the maximum-value detecting circuit 106, the minimum-value detecting circuit 107 and the subtractor 112.

At that time, the discrete signal X3 is outputted from the delay circuit 103 to the maximum-value detecting circuit 6, the minimum-value detecting circuit 107 and the subtractor 113, and the discrete signal X(N- 1) is outputted from the delay circuit 102 to the maximum-value detecting circuit 106, the minimum-value detecting circuit 107 and the subtractor 114. Furthermore, the discrete signal XN is provided from the input terminal 101 to the maximum-value detecting circuit 106, the minimum-value detecting circuit 107 and the subtractor 115.

As a result, the minimum-value detecting circuit 106 detects the maximum value Xmax of the N sampled-data X1 to XN of each block and then outputs the detected maximum value Xmax to the quantization circuit 108 whereupon a quantization of the value Xmax is effected with appropriate precision. The quantization circuit 108 outputs a quantization signal representing a result of the quantization to the subtractor 110 as a minuend signal representing a minuend.

On the other hand, the minimum-value detecting circuit 107 detects the minimum value Xmin of the N sampled-data X1 to XN of each block and subsequently supplies the detected minimum value Xmin to the quantization circuit 109 whereupon a quantization of the value Xmin is effected with suitable precision. The quantization circuit 109 outputs another quantization signal representing a result of the quantization to the subtractors 110 to 115 as a subtrahend signal representing a subtrahend and also outputs this quantization signal to the output terminal 122.

The signal outputted from the subtractor 110 represents the result of a subtraction of the quantization signal corresponding to the minimum value Xmin from that corresponding to the maximum value Xmax, namely the difference (Xmax−Xmin) between the maximum value and the minimum value of the N sampled-data of each block. This signal is outputted to the output terminal 121 and to the dividers 116 to 120 as a signal representing a divisor.

Outputs of the subtractors 111 to 115 are supplied to the dividers 116 to 120 respectively corresponding thereto as dividend signals, each representing a dividend. Thus, the normalized sampled-data Y1 to YN obtained by effecting the normalization processing based on equation (1) are supplied from the dividers 116 to 120 to the output terminals 123 to 127.

Thus, a normalized-data signal representing a result of the above described normalization (namely, normalized quantization data) is outputted from the normalization device of FIG. 7 to the terminals 123 to 127. Further, signals representing the two kinds of the normalization parameters to be set correspondingly to the normalized-data signal are sent to the terminals 121 and 122. Specifically, a signal representing a difference (Xmax−Xmin) between the maximum value Xmax and the minimum value Xmin of the signal within each block is provided as information on a degree of change of the signal within each block and another signal representing the minimum value Xmin of the sampled-data within each block is provided as information on a voltage level (i.e., a value of the amplitude) of a signal within each block.

Incidentally, a normalization device for normalizing a signal representing multi-dimensional data (hereunder referred to as a multi-dimensional signal) to be coded can be implemented by constructing a portion for performing a parallel distribution of an input signal in such a manner to be suitable for dividing the signal into blocks, each block having the same dimension as the data represented by the signal, thereby to obtain sampled-data within a block at a time. Further, the normalization device of FIG. 7 is constructed to effect a parallel processing of a signal representing input information. It is, however, apparent that the normalization device may be constructed to perform a normalization operation by effecting a serial processing.

Additionally, the quantization of the maximum value Xmax and the minimum value Xmin requires raising the maximum value Xmax and discarding the minimum value Xmin in order to limit the normalized sampled-data Yi to the range from 0 to k.

Next, the output signals of the first normalizing device 4 representing the DC "coefficients" and the AC "coefficients" are supplied to the quantizing device 5 whereupon the DC "coefficients" are quantized. Further, the quantized signals are supplied from the quantizing device 5 through an output terminal 6 to a decoding system as DC information.

On the other hand, the output signals of the first normalizing device 4 representing the AC "coefficients" are supplied to a second normalizing device 7, operation of which will be described hereinlater. The second normalizing device 7 normalizes the AC "coefficients" every block and outputs the normalized AC "coefficients".

Then, the output signals of the second normalizing device 7 representing the normalized AC "coefficients" are fed to a quantizing device 8. Further, output signals of the device, that is, the quantized signals are supplied through a terminal 9 to the decoding system as AC information.

Additionally, information on the maximum value and the minimum value of the "coefficients" is necessary for the decoding system. Thus, quantized normalizing information outputted from the first normalizing device 4 and the second normalizing device 7 is supplied through the respective output terminals 10 and 11 to the decoding system.

Next, an operation of the first normalizing device 4 will be described hereinbelow by referring to FIGS. 2 and 3.

Figure 2:
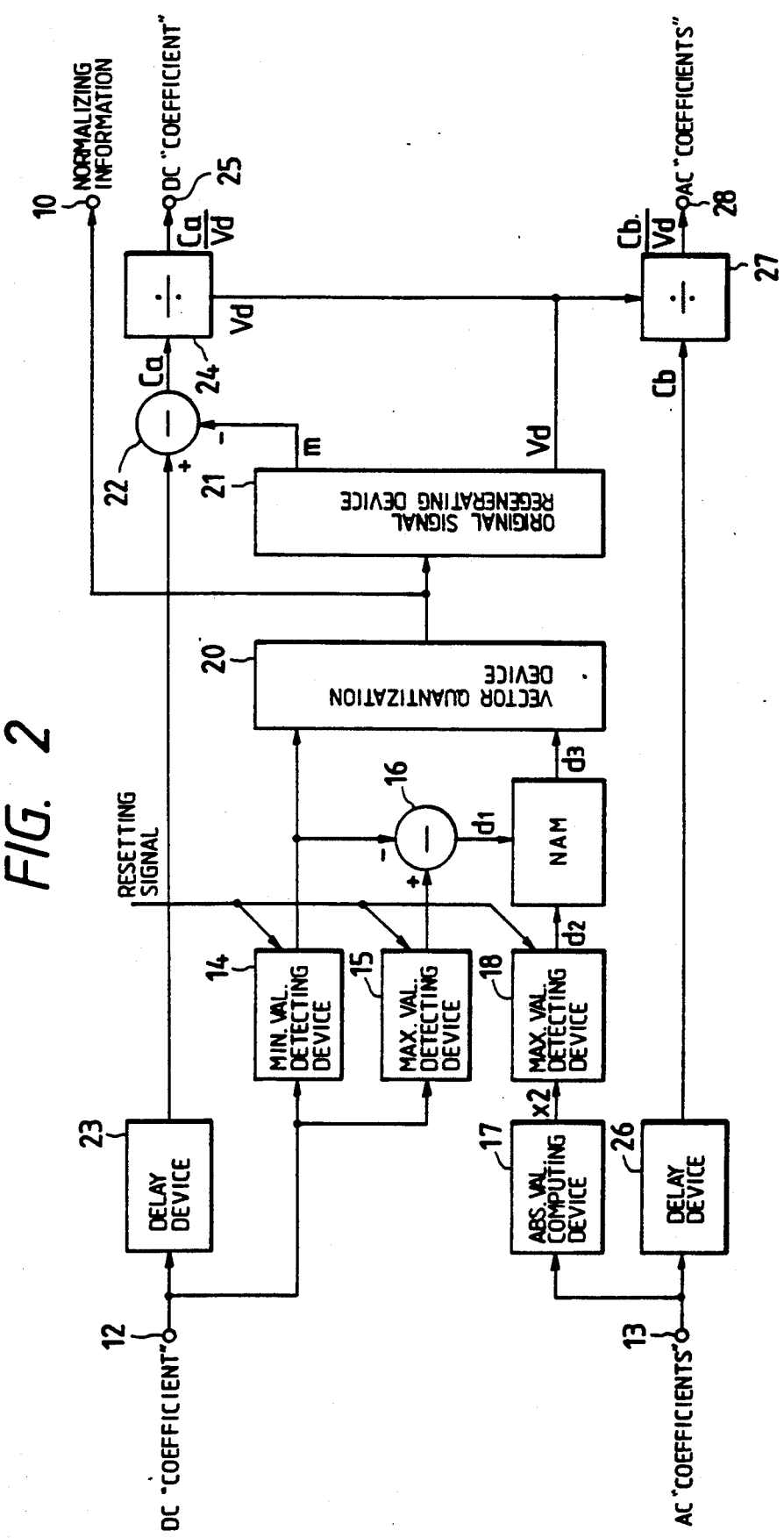
FIG. 2 is a block diagram showing first normalizing means of the embodiment of FIG. 1.

First, as shown in FIG. 2, the output signals of the orthogonal transforming device 3 representing the DC "coefficients" and the AC "coefficients" are inputted to input terminals 12 and 13, respectively. This is because the properties of the DC "coefficients" are different from those of the AC "coefficients" and thus a method for processing the DC "coefficients" should be different from a method for processing the AC "coefficients" as will be described hereunder.

One DC "coefficient" represents an average of the sampled values within one block and therefore is processed by using the maximum and the minimum values in a method which is the same as a method for normalizing the common sampled values.

On the other hand, in case of the AC "coefficients", an average value of the plurality of the AC "coefficients" approximates 0 and is not taken into considerations. Thus, absolute values of the AC "coefficients" are processed.

Figure 3A:
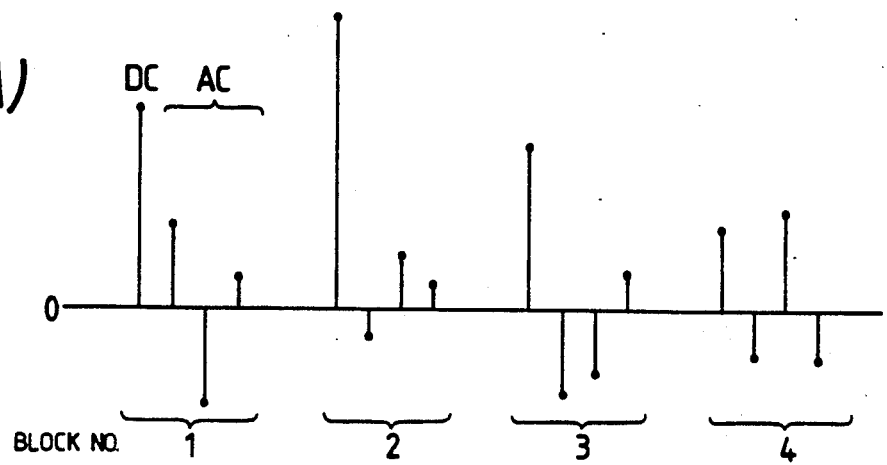
FIGS. 3 (A), (B) and (C) are diagrams each for illustrating an operation of the normalizing means of FIG. 2.
Figure 3B:
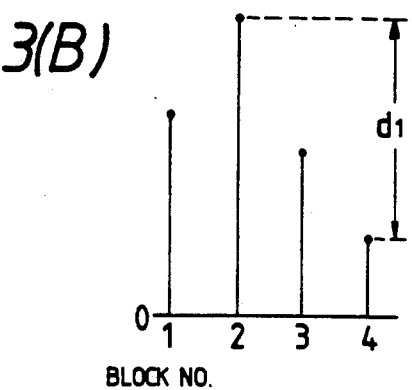
Figure 3C:
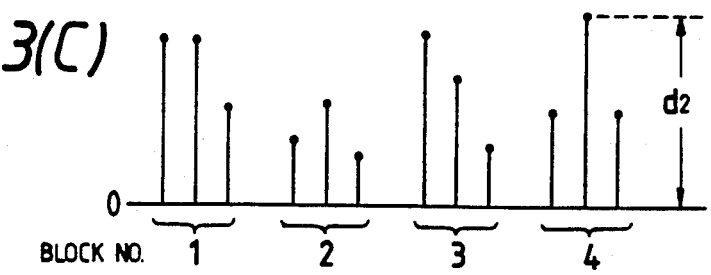

For example, in case of one-dimensional fourth-order orthogonal transform, one DC "coefficient" and three AC "coefficients" are outputted from the orthogonal transforming device 3 with respect to each of a plurality of blocks (in this case, four blocks) as shown in FIG. 3 (A).

Hereinafter, an operation of the normalizing device 4 will be described in such a case by way of example. FIG. 3 (B) shows only the DC "coefficients". Further, the DC "coefficients" are supplied to a minimum value detecting device 14 and to a maximum value detecting device 15 whereupon the minimum value and the maximum value of the DC "coefficients" of blocks serially inputted. Upon completion of the detection, the detecting devices 14 and 15 are reset by a resetting signal for processing signals representing the sampled values, which signals are inputted to the normalizing device 4 next time.

Further, the thus detected maximum and minimum values are supplied to a subtractor 16 whereupon the minimum value is subtracted from the maximum value to obtain a value of a difference $d_1$ between them as shown in FIG. 3 (B).

On the other hand, the signals representing the AC "coefficients" are supplied to an absolute-value computing device 17 whereupon the twelve AC "coefficients" (obtained by putting three AC "coefficients" of each of blocks Nos. 1 thru 4 together) are transduced to absolute values thereof. As the peak values of the AC "coefficients" transduced to the absolute values are reduced to half in comparison with the peak-to-peak values of the untransduced AC "coefficients", the values obtained by doubling such peak values are outputted from the device 17, as shown in FIG. 3 (C).

The output signals of the absolute-value computing device 17 are then supplied to a maximum-value detecting device 18 whereupon a maximum value $d_2$ of the AC "coefficients" of serially inputted blocks Nos. 1 thru 4 is detected. Thereafter, the device 18 is reset by a resetting signal for inputting the next signals representing sampled values.

Both the values of the difference $d_1$ of the DC "coefficients" and the maximum value $d_2$ of the AC "coefficients" represent variation values. Therefore, the values $d_1$ and $d_2$ have similar properties and can be treated in common with each other. Thus, both of the signals representing the values $d_1$ and $d_2$ are fed to a non-additive mixer (NAM) 19 whereupon a larger one is selected from the values $d_1$ and $d_2$ as a variation value $d_3$. The NAM operates in such a manner to select a larger one of the values represented by two input signals simultaneously inputted thereto and to output a signal representing the selected value.

The variation value $d_3$ and the minimum value (that is, the representative level value) detected by the minimum value detecting device 14 are supplied to a vector quantization device 20 which carries out vector quantization of the values inputted thereto. Thereby, the quantity of data can be substantially reduced.

Incidentally, the number of bits required for quantization can be further reduced by a two-dimensional vector quantization device proposed by the Applicant of the instant application in Japanese Patent Application Provisional Publication No. 63-62417 which will be described hereinbelow.

Figure 8:
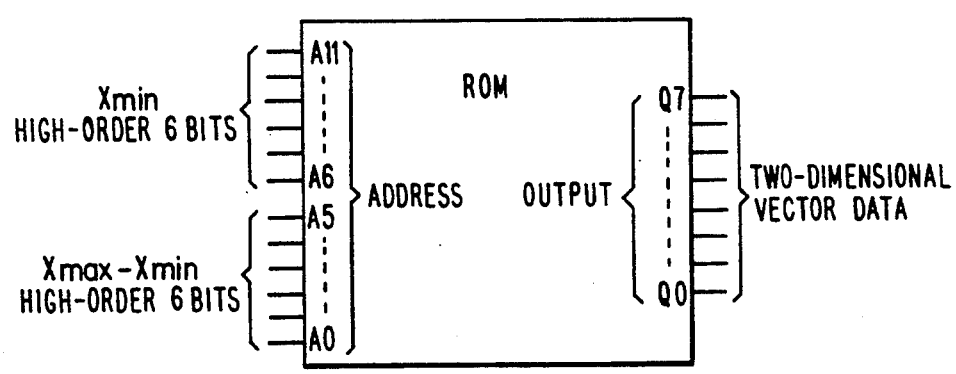
FIG. 8 is a circuit diagram showing the construction of a two dimensional vector quantizing device.

Referring to FIG. 8, there is shown the two-dimensional vector quantizing device constructed by using a read only memory. Incidentally, as hereinabove described, normalization based on equation (1) is performed by using the maximum value Xmax and the minimum value Xmin of the sampled-data in each block and taking into consideration the two kinds of normalization parameters which correspond to a degree of change of a signal within each block and a voltage level (i.e., a value of the amplitude) of a signal within each block. However, it should be noted that a normalization parameter which is a two-dimensional vector and is represented by using a small number of bits can be employed, instead of the two kinds of the normalization parameters, by considering the following concepts:

(1) The maximum value Xmax is naturally larger than or equal to the minimum value Xmin. Thus, if a detected maximum value Xmax is less than a detected minimum value Xmin of sampled-data of a certain region or block, such a region can be left out of consideration.

(2) Influence of errors of the minimum value Xmin and the difference (Xmax-Xmin) is inversely proportional to the difference (Xmax-Xmin). Therefore, if a coarse quantization is employed in case where the difference (Xmax-Xmin) is relatively large, there occur no problems. Namely, the quantization may be effected by using a small number of quantization steps.

(3) The difference (Xmax-Xmin) usually has a relatively small value and hardly has a large value.

Further, the representative level value and the variation value quantized by the vector quantization device 20 are supplied by way of the output terminal 10 to the decoding system as the normalizing information and also to an original signal regenerating device 21 whereupon the original signals are regenerated from the quantized signals, and the minimum value (that is, the value of the representative level) m and the variation value Vd, of which data are reduced, are obtained.

Moreover, output signals of the regenerating device 21 representing the minimum value m are supplied to a subtracter 22.

Furthermore, the signals inputted from the input terminal 12 representing the DC "coefficient" are fed to a delay device 23. Thus, output signals of the delay device 23 are delayed by an appropriate time until processing of all of the "coefficients" is completed, and are then supplied to the subtracter 22 which subtracts the minimum value m indicated by the output signal of the regenerating device 21 from the DC "coefficients" indicated by the output signal of the delay device 23, and thus obtains DC "coefficients" Ca.

By this operation, the minimum value of the DC "coefficient" becomes 0 and the levels of the DC "coefficients" are shifted throughout. Thus, excessive or unnecessary data are reduced.

Further, the output signals of the subtracter 22 representing the DC "coefficients" Ca and those of the regenerating device 21 representing the variation value Vd are supplied to a divider 24 whereupon the following division is effected: Ca÷Vd. Thus, the DC "coefficients" are normalized such that the magnitudes of the DC "coefficients" fall within a range from 0 to 1. Signals representing the normalized DC "coefficients" are outputted from an output terminal 25.

On the other hand, the signals representing the AC "coefficients" are supplied from the input terminal 13 to a delay device 26 and are delayed by an appropriate time until processing of all of the "coefficients" is effected.

Furthermore, the output signals of the delay device 26 representing the AC "coefficients" Cb are supplied to a divider 27 whereupon the following division is effected by using the variation value Vd indicated by the output signals of the regenerating device 21: Cb÷Vd. Thus, the AC "coefficients" are normalized such that the magnitudes of the AC "coefficients" fall within a range from 0 to 1. Signals representing the normalized AC "coefficients" are outputted from an output terminal 28.

Next, an operation of the second normalizing device 7 will be described hereinbelow by referring to FIGS. 4 and 5.

Figure 4:
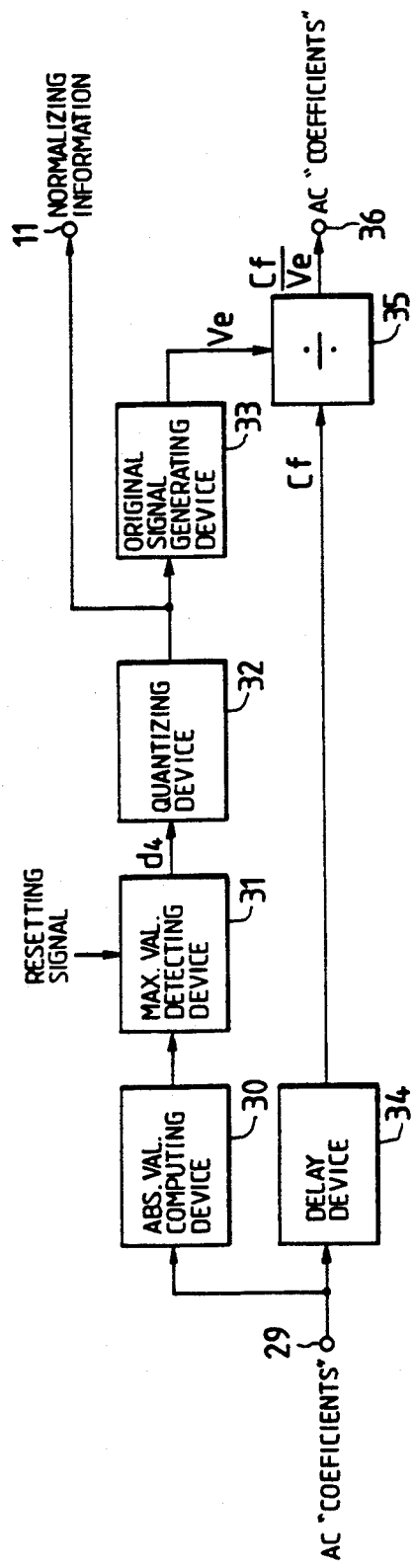
FIG. 4 is a block diagram showing second normalizing means of the embodiment of FIG. 1.
Figure 5:
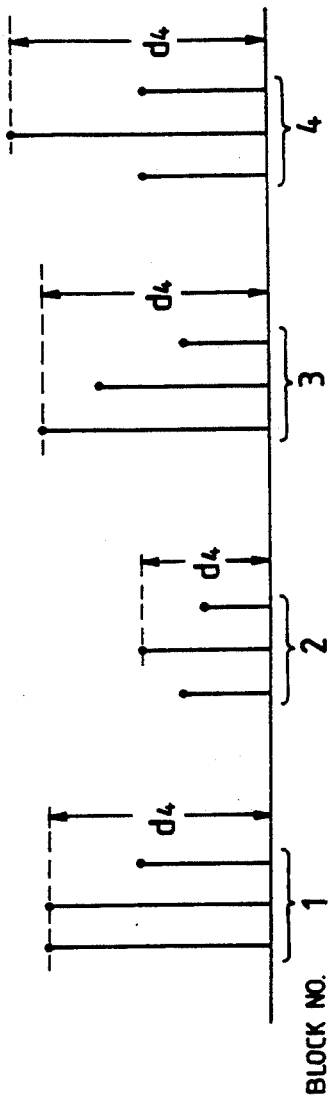
FIG. 5 is a diagram for illustrating an operation of the second normalizing means of FIG. 3.

As shown in FIG. 4, the output signals of the first normalizing device 4 representing the AC "coefficients" are inputted from an input terminal 29 to an absolute-value computing device 30 whereupon the absolute-values of the AC "coefficients" are computed.

Further, output signals of the absolute-value computing device 30 are supplied to a maximum-value detecting device 31 whereupon the maximum values $d_4$ of the AC "coefficients" of each of the blocks Nos. 1 thru 4 are detected. Then, the maximum value detecting device 31 is reset by resetting the signal for receiving the next sampled values.

Furthermore, the signals representing the maximum values $d_4$ are fed to a quantizing device 32 whereby excessive or unnecessary data are reduced.

Incidentally, in case of the second normalizing device 7, only AC "coefficients" are processed. Further, there is only one value per block as the normalizing information. Thus, in this case, scalar quantization is effected instead of vector quantization. Thereby, the construction of the system can be simplified.

Output signals of the quantizing device 32 are supplied through the output terminal 11 to the decoding system as signals indicating the normalizing information, and are also supplied to an original signal regenerating device 33 whereupon the original signals are regenerated or reproduced from the quantized signals. Thus, there is obtained a variation value Ve of which data are reduced. The output signals of the regenerating device 33 indicating the variation value Ve are fed to a divider 35.

In the meantime, the signals inputted from the input terminal 29 representing the AC "coefficients" are supplied to a delay device 34 and delayed by an appropriate time.

The, output signals of the delay device 34 indicating the AC "coefficients" Cf are supplied to the divider 35 whereupon the following division is effected by using the variation value Ve indicated by the output signals of the regenerating device 33: Cf÷Ve. Thus, the AC "coefficients" are normalized by using the variation value Ve. Signals representing the normalized AC "coefficients" are outputted from an output terminal 36.

Therefore, the above processing by the second normalizing device is effected such that the maximum of the absolute values of "coefficients" of each block is constant. Thereby, in comparison with the conventional coding, more accurate normalization of the "coefficients" of each block is achieved by effecting the first and second normalizing processing as above described.

As a result, in the highly efficient coding system of the present invention, the normalization is effected twice on the variation components. Further, the precision of the normalization to be effected by each of the first and second normalizing devices may be lower than that of a normalization wherein the normalization is effected only once as in the conventional coding system. Thus, in case of the highly efficient coding system of the present invention, the quantity of data or information required for normalization is not so large.

Further, as described above, in the embodiment of the first normalizing device of FIG. 3, the minimum value is supplied to the vector quantization device as the representative value. It is, however, apparent to those skilled in the art that the maximum value or the mean value may be supplied as the representative value, in place of the minimum value, to the vector quantization device.

Moreover, the highly efficient coding system of the present invention can achieve a high efficiency, which is substantially equal to the efficiency of the conventional coding system, even when using blocks of a size smaller than the size of blocks used for an orthogonal transform in the conventional coding system.

Furthermore, a highly efficient coding system according to the present invention using blocks of such a size for orthogonal transform can have normalizing information and realize adaptive quantization using normalizing information.

While a preferred embodiment of the present invention has been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. A highly efficient coding system for converting electrical input digital image signals to efficiently coded electrical output signals, comprising:
a blocking means for dividing electrical input digital image signals representing sampled values into a plurality of blocks and outputting first electrical output signals representing the plurality of blocks;
an orthogonal transformation means for receiving the first electrical output signals of said blocking means corresponding to the blocks and for generating an electrical mean component signal representing a mean component of a result of an orthogonal transformation of the first electrical output signals and an electrical variation component signal representing a variation component of the result of the orthogonal transformation of the first electrical output signals;
a first normalizing means for receiving the electrical mean component signal and the electrical variation component signal and for generating second electrical output signals representing results of an inter-block normalization of the electrical mean component signal and the variation component signal; and
a second normalizing means for receiving the second electrical output signals and for generating third electrical output signals representing a result of a normalization of variation components of the second electrical output signals of said first normalizing means in each of the blocks.

2. A highly efficient coding system as set forth in claim 1, wherein said first normalizing means includes a vector quantization means for receiving the electrical mean component signals and the electrical variation component signals and for generating an electrical normalizing information signal representing a result of a quantization of an original representative value, which is a minimum value of the mean components represented by the electrical mean component signals, and a variation value, which is a larger one of a maximum value of the variation components represented by the electrical variation component signals and a difference between a maximum value and the minimum value of the mean components.

3. A highly efficient coding system for converting electrical input digital image signals to efficiently coded electrical output signals, comprising:
a blocking means for dividing electrical input digital image signals representing sampled values into a plurality of blocks and outputting first electrical output signals representing the plurality of blocks;
an orthogonal transformation means for receiving the first electrical output signals of said blocking means corresponding to the blocks and for generating an electrical mean component signal representing a mean component of a result of an orthogonal transformation of the first electrical output signals and an electrical variation component signal representing a variation component of the result of the orthogonal transformation of the first electrical output signals; and a first normalizing means for receiving the electrical mean component signal and the electrical variation component signal and for generating second electrical output signals representing results of an interblock normalization of the electrical mean component signal and the electrical variation component signal, wherein said first normalizing means includes a vector quantization means for receiving the electrical mean component signal and the electrical variation component signal and for generating an electrical normalizing information signal representing a quantized representative value, which is a minimum value of the mean components represented by the electrical mean component signal, and a quantized variation value, which is a larger one of a maximum value of the variation components represented by the variation component signal and a difference between a maximum value and the minimum value of the mean components.

4. A highly efficient coding system as set forth in claim 3, wherein said first normalizing means further includes an original signal regenerating means for regenerating original signals from the quantized representative value and the quantized variation value and for outputting a regenerated representative value, of which data are reduced, and a subtracting means for subtracting the regenerated representative value from a value of the mean component.

5. A highly efficient coding system as set forth in claim 1, wherein said second normalizing means includes:
an absolute value computing means for receiving the second electrical output signals and for generating an electrical absolute value signal representing absolute values of values represented by the second electrical output signals;
a maximum value detecting means for receiving the electrical absolute value signals and for generating an electrical maximum value signal representing a maximum value of the absolute values represented by the electrical absolute value signals; and
a quantizing means for receiving the electrical maximum value signal and for generating an electrical normalizing information signal representing a result of a quantization of the maximum value of the variation components of each of the blocks.

6. A system converting an electrical input digital image signal including image data representing an input image to an efficiently encoded electrical signal having reduced redundancy capable of transmission over a limited bandwidth communication channel and of storage in a limited storage, comprising:
means for receiving electrical input digital image signals including image data representing an input image, and
converting means for converting said electrical input digital image signals to electrical output signals by reducing redundancy of image data in said electrical input image signals,
said converting means including:

a blocking means for dividing said electrical input digital image signals including said image data into a plurality of blocks and outputting first electrical output signals representing the plurality of blocks;
an orthogonal transformation means for receiving the first electrical output signals of said blocking means representing the blocks and performing an orthogonal transformation of the first electrical output signals, said orthogonal transformation means including:
means for obtaining a mean component of the result of said orthogonal transformation and generating an electrical mean component signal representing said mean component, and
means for obtaining a variation component of the result of said orthogonal transformation and generating an electrical variation component signal representing said variation component;
a first normalizing means connected to receive the electrical mean component signal and the electrical variation component signal for performing an interblock normalization of the electrical mean component signal and the electrical variation component signal and for generating second electrical output signals representing results of said interblock normalization;
a second normalizing means connected to receive the second electrical output signals for performing a normalization of variation components of the second electrical output signals of said first normalizing means in each of the blocks and for providing an electrical output signal representing a result of said normalization of variation components; and
means for receiving said electrical output signal from said second normalizing means and for generating third electrical output signals representing a quantized result of said normalization of variation components.

7. A signal converting system as set forth in claim 6, wherein said first normalizing means includes a vector quantization means connected to receive the electrical mean component signal and the electrical variation component signal for performing a quantization of an original representative value, which is a minimum value of the mean components represented by the electrical mean component signal, and a variation value, which is a larger one of a maximum value of the variation components represented by the electrical variation component signal and a difference between a maximum value and the minimum value of the mean components, and for generating an electrical normalizing information signal representing a result of said quantization.

8. A signal converting system as set forth in claim 7, wherein said first normalizing means further comprises:
a minimum value detecting device for detecting a minimum value of said mean component and producing an electrical minimum value signal representative thereof, a first maximum value detecting device for detecting a maximum value of said mean component and producing a first electrical maximum value signal representative thereof, and a subtractor for substracting said electrical minimum value signal from said first electrical maximum value signal to produce an electrical difference signal representing said difference between a maximum value and the minimum value of the mean components, an absolute value computing device for computing an absolute value of said variation components and producing an electrical absolute value signal representative thereof, and a second maximum value detecting device for detecting a maximum value of said electrical absolute value signal and producing a second electrical maximum signal representative thereof, and a non additive mixer receiving said electrical difference signal and said second electrical maximum signal for selecting a larger value of the values of said electrical difference signal and said second electrical maximum signal and for producing an electrical mixer output signal representative thereof as said variation value to said vector quantization means.

9. A signal converting system as set forth in claim 6, wherein said second normalizing means includes:

an absolute value computing means connected to receive the second electrical output signals for obtaining absolute values of values represented by the second electrical output signals, and for generating an electrical absolute value signal representing said absolute values;

a maximum value detecting means connected to receive the electrical absolute value signal for obtaining a maximum value of the absolute values represented by the electrical absolute value signal, and for generating an electrical maximum value signal representing said maximum value; and a quantizing means connected to receive the electrical maximum value signal for quantizing the maximum value of the variation components of each of the blocks and for generating an electrical normalizing information signal representing a result of said quantization.

10. A system for converting an electrical input digital image signal including image data representing an input image to an efficiently encoded electrical signal having reduced redundancy capable of transmission over a limited bandwidth communication channel and of storage in a limited storage, comprising:

means for receiving electrical input digital image signals including image data representing an input image, and converting means for converting said electrical input digital image signals to electrical output signals by reducing redundancy of image data in said electrical input digital image signals, said converting means including:

a blocking means for dividing said electrical input digital image signals including sampled values of said image data into a plurality of blocks and outputting first electrical output signals representing the plurality of blocks;

an orthogonal transformation means for receiving the first electrical output signals of said blocking means representing the blocks and performing an orthogonal transformation of the first electrical output signals, said orthogonal transformation means including:

means for obtaining a mean component of the result of said orthogonal transformation and generating an electrical mean component signal representing said mean component, and means for obtaining a variation component of the result of said orthogonal transformation and generating an electrical variation component signal representing said variation component; and a first normalizing means connected to receive the electrical mean component signal and the electrical variation component signal for performing an interblock normalization of the mean component signal and the electrical variation component signal and for generating second electrical output signals representing results of said interblock normalization;

said first normalizing means including a vector quantization means for receiving the electrical mean component signal and the electrical variation component signal and for generating an electrical normalizing information signal representing a quantized representative value obtained by quantization of an original representative value, which is a minimum value of the mean components represented by the electrical mean component signal, and a quantized variation value, which is a larger one of a maximum value of the variation components represented by the variation component signal and a difference between a maximum value and the minimum value of the mean components.

11. A signal converting system as set forth in claim 10, wherein said first normalizing means further includes an original signal regenerating means for regenerating electrical original signals from the quantized representative value and the quantized variation value and for outputting an electrical regenerated representative value signal, of which data are reduced, and a subtracting means for subtracting the regenerated representative value from a value of the mean component and to produce an electrical signal representative thereof.

* * * * *